United States Patent
Leblanc et al.

(10) Patent No.: US 10,525,798 B2
(45) Date of Patent: Jan. 7, 2020

(54) WINDSHIELD ADJUSTMENT MECHANISM

(71) Applicant: SOUCY INTERNATIONAL INC., Drummondville (CA)

(72) Inventors: Etienne Leblanc, Trois-Rivieres (CA); Nicolas Aube, Drummondville (CA); Benoit Savage, Saint-Bonaventure (CA); Martin Provencher, Saint-Edmond-de-Grantham (CA); Maxime Normand, Victoriaville (CA); Genevieve Therrien, Drummondville (CA); Pascal Gaudet, Drummondville (CA)

(73) Assignee: SOUCY INTERNATIONAL INC., Drummondville (CA)

( * ) Notice: Subject to any disclaimer, the term of this patent is extended or adjusted under 35 U.S.C. 154(b) by 144 days.

(21) Appl. No.: 15/727,013

(22) Filed: Oct. 6, 2017

(65) Prior Publication Data

US 2018/0099543 A1    Apr. 12, 2018

Related U.S. Application Data

(60) Provisional application No. 62/404,944, filed on Oct. 6, 2016.

(51) Int. Cl.
*B60J 1/04* (2006.01)
*B62J 17/04* (2006.01)

(52) U.S. Cl.
CPC .................... *B60J 1/04* (2013.01); *B62J 17/04* (2013.01)

(58) Field of Classification Search
CPC ....... B60J 1/04; B60J 1/06; B60J 1/025; B60J 3/002; B60J 7/1621

(Continued)

(56) References Cited

U.S. PATENT DOCUMENTS 1,537,706 A    5/1925   Helmer
1,835,405 A  * 12/1931  Kaplan ................. B60J 7/067
                                                    296/219

(Continued)

FOREIGN PATENT DOCUMENTS

CA       2262038 A1    8/1999
CN     103419603 A    12/2013

(Continued)

OTHER PUBLICATIONS

English abstract of CN 103419603 retrieved from Espacenet on Oct. 4, 2017.

(Continued)

*Primary Examiner* — D Glenn Dayoan
*Assistant Examiner* — Sunsurraye Westbrook
(74) *Attorney, Agent, or Firm* — BCF LLP

(57) ABSTRACT

Windshield adjustment mechanism includes a support including part of a first pivotable connector and part of a second pivotable connector that are spaced apart from one another. Mechanism includes a mount that has a guideway and part of a third pivotable connector. Mechanism includes a carriage that has part of the first pivotable connector and is slidingly mounted with respect to the guideway. Mechanism includes a link that includes part of the second pivotable connector and part of the third pivotable connector that are spaced apart from one another. First pivotable connector, second pivotable connector, third pivotable connector are positioned, and support, guideway, carriage and link are positioned, oriented and dimensioned, such that sliding of carriage causes simultaneous (i) translating of support and of carriage with respect to mount via translation of first pivotable connector, (ii) pivoting of support with respect to carriage about a first pivotable connector axis.

19 Claims, 16 Drawing Sheets

(58) Field of Classification Search
USPC ....... 296/96.2, 78.1, 92, 90, 95.1, 96, 96.11, 296/24.34, 210; 424/426, 400, 468, 472, 424/75, 9.2
See application file for complete search history.

(56) References Cited

U.S. PATENT DOCUMENTS

| | | | |
|---|---|---|---|
| 2,319,869 A | 5/1943 | Kramer | |
| 2,355,860 A | 8/1944 | Hansen | |
| 2,716,041 A | 8/1955 | Charles | |
| 4,795,205 A | 1/1989 | Gerber | |
| 5,362,118 A | 11/1994 | Houriez | |
| 5,938,267 A | 8/1999 | Schurig | |
| 6,752,447 B2 | 6/2004 | Gagne | |
| 6,948,757 B2 | 9/2005 | Wegener et al. | |
| 7,000,971 B2 | 2/2006 | Wegener et al. | |
| 7,144,061 B1 | 12/2006 | Behm et al. | |
| 7,165,802 B1* | 1/2007 | Flynn | B60J 1/06 296/84.1 |
| 7,225,718 B1* | 6/2007 | Grove | F41H 5/266 89/36.07 |
| 7,810,422 B2 | 10/2010 | David et al. | |
| 7,883,136 B2 | 2/2011 | Tomolollp et al. | |
| 8,292,355 B2 | 10/2012 | Miller | |
| 8,641,093 B1 | 2/2014 | Knight | |
| 9,073,411 B2 | 7/2015 | Neag et al. | |
| 9,365,094 B2 | 6/2016 | Salamon | |
| 9,499,029 B2 | 11/2016 | Gaudet et al. | |
| 2009/0026803 A1* | 1/2009 | Yano | B60J 1/04 296/190.1 |
| 2015/0084363 A1 | 3/2015 | Neag et al. | |

FOREIGN PATENT DOCUMENTS

| | | |
|---|---|---|
| DE | 3941875 A1 | 6/1991 |
| DE | 29708742 U1 | 7/1997 |
| FR | 2630052 B1 | 8/1990 |
| FR | 2766767 B1 | 10/1999 |
| GB | 2346175 A | 8/2000 |
| JP | 2005154128 A | 6/2005 |
| WO | 2002053449 A1 | 7/2002 |

OTHER PUBLICATIONS

English abstract of JP 2005154128 retrieved from Espacenet on Oct. 4, 2017.
English abstract of FR 2630052 retrieved from Espacenet on Oct. 4, 2017.
English abstract of FR 2766767 retrieved from Espacenet on Oct. 4, 2017.
English abstract of DE 3941875 retrieved from Espacenet on Oct. 6, 2017.
Four-Bar Mechanism, http://ocw.metu.edu.tr/pluginfile.php/3957/mod_resource/content/0/ch7/7-1.htm, 16 pages, retrieved on Oct. 5, 2017.
Four-bar linkage, Wikipedia, https://en.wikipedia.org/wiki/Four-bar_linkage, 5 pages, retrieved on Oct. 5, 2017.
Linear Guideway Technical Information, Hiwin Motion Control and System Technology, Industrie 4.0 Best Partner, Hiwin Technologies Corp., Taiwan, 2017, 195 Pages.

* cited by examiner

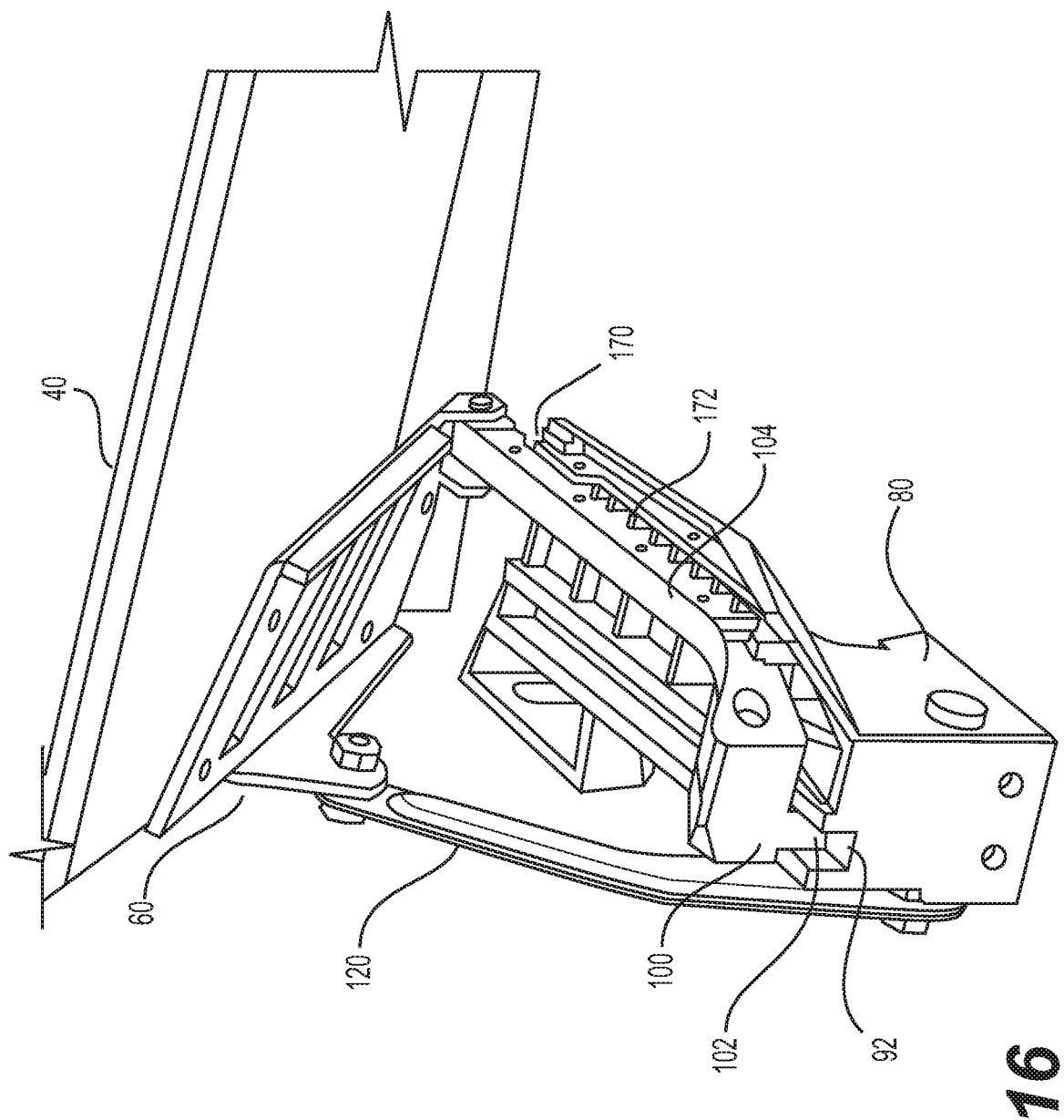

WINDSHIELD ADJUSTMENT MECHANISM

CROSS-REFERENCE

The present application claims the priority of U.S. Provisional Patent Application No. 62/404,944, filed Oct. 6, 2016, entitled "Adjustable Windshield for Seated Type Vehicle", the entirety of which is incorporated herein by reference.

FIELD

The present technology relates to windshield adjustment mechanisms for a windshield of a vehicle.

BACKGROUND

Some vehicles, such as motorcycles, all-terrain vehicles and utility task vehicles (i.e. UTV, "side-by-side") are capable of transporting their occupants (driver, passengers) under various speed, terrain (e.g., on-road or off-road) and weather conditions. Such driving conditions can expose the occupants of the vehicle to air flow, debris (e.g., soil, mud, gravel, sand, or snow, etc.) and weather elements (e.g., rain, sleet, snow, etc.), adversely affecting them. Conventionally, such vehicles may be equipped with rigidly-fixed windshields to protect their occupants.

Under some conditions, such rigidly-fixed windshields may be less than optimal. For example, a vehicle that is a UTV may be driven over muddy terrain and/or in cold weather conditions and have its windshield obstructed by an accumulation of debris. This debris may be difficult to remove by conventional means on the vehicle such as irrigated windshield wipers and/or heaters. In such situations, the driver would need to stop the vehicle to clean the windshield.

Known solutions exist to improve the effectiveness of a vehicle's windshield to meet the occupant's needs, including those which change with respect to changing driving conditions.

For example, some vehicles are equipped with windshields that are sized to protect the occupants by shielding the front aspect of the cabin from the hood to the roof in full (i.e., full windshield) or in part (i.e., half windshield). Understandably, a half windshield may provide some degree of protection from air flow and debris by extending upwardly from the hood and stopping short of the occupant's line of sight, maintaining some degree of visibility.

In addition, a vehicle may have a windshield that is removably fastened to the vehicle (i.e., an operative position). When maximum air flow and visibility are desired, the windshield may be manually unfastened and stored (i.e., an inoperative position), although inconveniently requiring the vehicle to be stopped when so doing.

Moreover, some vehicles may be equipped with windshield adjustment mechanisms to allow an occupant to move the windshield to and from operative and inoperative positions while the windshield remains attached to the vehicle. However, due to the demanding driving conditions UTVs are made for, it is inopportune to directly transpose the windshield adjustment mechanisms not specifically designed for UTVs to such vehicles.

For example, known windshield adjustment mechanisms impart a windshield with a limited range of motion, which may render one or both of its operative and inoperative positions less effective than those of a removably fastened windshield for the same vehicle. Other known windshield adjustment mechanisms are arranged such that the windshield is imparted with a sequence of translating and/or pivoting motions, resulting in the windshield being aligned with respect to either the hood or the roof of the vehicle when in the inoperative position. They are, however, not without their drawbacks.

Under certain conditions, such mechanisms may undesirably shift the center of mass of the windshield, of any debris accumulated on the windshield, of the mechanism and of the occupant, should the mechanism be manually operated, and potentially reduce the UTV's stability.

In addition, the kinematics of such mechanisms may result in undesirable decreases in protection and visibility levels while the windshield is in between the operative and inoperative positions.

Furthermore, the kinematics of such mechanisms may require clearance in areas prone to debris accumulation such as the hood or the roof, and/or create a space between vehicle and mechanism elements in which debris could be trapped while the windshield is in between the operative and inoperative positions, potentially rendering the mechanism inoperable until the debris is removed.

Therefore, it is believed that there is a need for windshield adjustment mechanisms being particularly, although not exclusively, adapted to UTVs.

SUMMARY

It is an object of the present technology to ameliorate at least some of the inconveniences present in the prior art.

It is also an object of the present technology to provide a windshield adjustment mechanism for a windshield of a vehicle which is improved in at least some instances as compared with some of the prior art.

According to one aspect of the present technology, there is provided a windshield adjustment mechanism that is attachable to a vehicle and to which a windshield is attachable. A typical (although non-limiting) vehicle to which a windshield adjustment mechanism being an embodiment of the present technology may be attached has front, a rear, a driver's side, a passenger's side, a frame forming a roll cage having front pillars extending to the driver's side and the passenger's side of the vehicle, and a hood attached to the frame and extending to the front of the vehicle, the hood having a top surface and a cowling. A typical windshield to which a windshield adjustment mechanism of the present technology may be attached has a bottom edge, a top edge, lateral edges extending to the driver's side and the passenger's side of the vehicle, an externally-facing surface and an internally-facing surface.

The windshield adjustment mechanism includes a support being attachable to the windshield. The support includes a part of a first pivotable connector and a part of a second pivotable connector. The part of the first pivotable connector and the part of the second pivotable connector of the support are spaced apart from one another.

The windshield adjustment mechanism further includes a mount being attachable to the frame of the vehicle. The mount includes a guideway and a part of a third pivotable connector.

The windshield adjustment mechanism further includes a carriage. The carriage includes a complementary part of the first pivotable connector. The carriage has a portion that is slidingly mounted with respect to the guideway and is slidable between a forward most position and a rearward most position with respect to the guideway.

The windshield adjustment mechanism further includes a link. The link includes a complementary part of the second pivotable connector and a complementary part of the third pivotable connector. The complementary part of the second pivotable connector and the complementary part of the third pivotable connector of the link are spaced apart from one another.

The windshield adjustment mechanism of the present technology is directed in part towards improving the actuation of the mechanism with a continuous motion and between operative and inoperative positions adapted to UTV driving conditions.

The first pivotable connector, the second pivotable connector and the third pivotable connector being positioned each with respect to the others, and the support, the guideway, the carriage and the link are positioned, oriented and dimensioned, such that when the carriage is slid with respect to the guideway, the windshield adjustment mechanism causes a simultaneous (i) translating of the support and of the carriage with respect to the mount via translation of the first pivotable connector, (ii) pivoting of the support with respect to the carriage about a first pivotable connector axis, whereby a position of the windshield attached to the support is adjusted between an operative position and an inoperative position.

In some embodiments of the windshield adjustment mechanism of the present technology, the carriage is operatively connectable to an actuator to cause the carriage to slide with respect to the guideway.

In some embodiments, the actuator is electrically-operated, including those being power-operated by an energy source and a motor attached to the vehicle.

In some embodiments, the actuator is manually-operated, including by an occupant of the vehicle.

In some embodiments of the present technology, the mechanism is structured and arranged such that, when the mechanism is mounted to a vehicle and a windshield is attached to the support, manual repositioning of the windshield causes the carriage to slide with respect to the guideway.

In some embodiments of the windshield adjustment mechanism of the present technology, the mechanism includes a lock that is structured and positioned to selectively maintain the carriage in at least one position with respect to the guideway intermediate the forwardmost position and the rearwardmost position, thereby selectively maintaining the windshield in at least one position intermediate the operative position and the inoperative position.

In some embodiments, the lock is integral to the actuator operatively connected to the carriage and has the static load-bearing capacity to allow, under certain circumstances, an occupant to selectively maintain the carriage in at least one position with respect to the guideway intermediate the forward most position and the rearward most position, thereby selectively maintaining the windshield in at least one position intermediate the operative position and the inoperative position.

Some embodiments of a windshield adjustment mechanism of the present technology are directed in part towards normalizing the force needed to operate the mechanism. As such, in some embodiments, the first pivotable connector, the second pivotable connector and the third pivotable connector are positioned each with respect to the others, and the support, the guideway, the carriage and the link are positioned, oriented and dimensioned such that the force required to be exerted by the actuator to cause the carriage to slide to and from any position between the forwardmost position and the rearwardmost position remains within the operating capacity of the actuator.

In some embodiments of a windshield adjustment mechanism of the present technology, pivoting the support about the first pivotable connector axis causes pivoting of the link about the third pivotable connector axis.

In some embodiments, the first pivotable connector, the second pivotable connector and the third pivotable connector are positioned each with respect to the others, and the support, the guideway, the carriage and the link are positioned, oriented and dimensioned, such that when the carriage is slid with respect to the guideway, the windshield adjustment mechanism further causes a simultaneous (iii) pivoting of the support with respect to the link about a second pivotable connector axis, (iv) pivoting of the link with respect to the mount about a third pivotable connector axis.

In some embodiments of a windshield adjustment mechanism of the present technology, when the mechanism is attached to a vehicle and when a windshield is attached to the support and the carriage is at any position between the forwardmost position and the rearwardmost position, the bottom edge of the windshield is at a constant distance from a plane defined by a line collinear with the first pivotable connector axis when the carriage is in the forwardmost position and another line collinear with the first pivotable connector axis when the carriage is in the rearwardmost position.

In some embodiments of a windshield adjustment mechanism of the present technology, when the mechanism is attached to a vehicle and when a windshield is attached to the support and the carriage is at any position between the forward most position and the rearward most position, the bottom edge of the windshield is at distance from the top surface of the hood that is no greater than 5% of a distance between a line collinear with the first pivotable connector axis when the carriage is in the forward most position and another line collinear with the first pivotable connector axis when the carriage is in the rearward most position.

In some embodiments of a windshield adjustment mechanism of the present technology, when the mechanism is attached to a vehicle, and when a windshield is attached to the support and the carriage is at any position between the forward most position and the rearward most position, the bottom edge of the windshield is at distance from the top surface of the hood that is no greater than 10 mm.

In some embodiments of a windshield adjustment mechanism of the present technology, when the mechanism is attached to a vehicle and a windshield is attached to the support, the windshield is in an inoperative position when the carriage is at the forwardmost position and the windshield is in an operative position when the carriage is the rearwardmost position.

In some embodiments of a windshield adjustment mechanism of the present technology, when the mechanism is attached to a vehicle and when a windshield is attached to the support, the windshield is at one of a plurality of partially-operative positions when the carriage is at one of a plurality of positions between the forwardmost position and the rearwardmost position.

In some embodiments of a windshield adjustment mechanism of the present technology, the carriage has a front portion and a rear portion. The front portion of the carriage has the second part of the first pivotable connector. The rear portion of the carriage is the portion that is slidingly mounted with respect to the guideway.

In some embodiments of a windshield adjustment mechanism of the present technology, the support further includes a tab that defines the part of a first pivotable connector and a tab that defines the part of the second pivotable connector.

As mentioned above, the support includes a part of a first pivotable connector and a part of a second pivotable connector. When the mechanism is attached to a vehicle and a windshield is attached to the support, in some embodiments, the support further includes a bracket, a second link and a third link. The bracket includes an external part that attaches to the externally-facing surface of the windshield, and an internally-facing part that attaches to the internal surface of the windshield. The second link is attached to and extends laterally from the bracket. The third link is attached to the second link and extends with respect to a lateral edge of the windshield. The third link also has the part of the first pivotable connector and the part of the second pivotable connector. Furthermore, the bracket and the attached windshield are positioned interior to the pillar. The second link projects outwardly from the bracket and rearwardly from the pillar. The third link is exterior of the pillar and extends relative to a lateral edge of the windshield. The mount, the carriage and the link are also positioned exterior to the pillar. Therefore, such a support may, under certain circumstances, improve the visibility for the occupants by minimizing the obstruction of the line of sight by the windshield adjustment mechanism. In addition, such a support may, under certain circumstances, improve the redirection of the air flow and debris by allowing the windshield adjustment mechanism and the attached windshield to maintain an improved fit with respect to the top surface of the hood and the pillar.

In some embodiments of a windshield adjustment mechanism of the present technology when the mechanism is attached to a vehicle and a windshield is attached to the support, the mount is covered by a protector and attached to a pillar with a pillar bracket. The protector may include an internal part and an external part. Under certain circumstances, the external part and internal part of the protector may prevent debris from interfering with elements of the mechanism and rendering it inoperable. Under certain circumstances, the pillar bracket may allow the mechanism to withstand increased loads imparted to the windshield (e.g., air flow, debris, etc.) by further rigidly attaching the mount to the vehicle.

In some embodiments of a windshield adjustment mechanism of the present technology, when the mechanism is viewed laterally from the driver side, the first pivotable connector, the second pivotable connector and the third pivotable connector are positioned in a triangular relationship.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first pivotable connector" and "third pivotable connector" is not intended to imply any particular order, type, chronology, hierarchy or ranking (for example) of/between the server, nor is their use, by itself, intended imply that any "second pivotable connector" must necessarily exist in any given situation.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 5 is an exploded view taken from a top, rear, left side of the elements of a left side windshield adjustment mechanism of FIG. 1, of a right side windshield adjustment mechanism of FIG. 1, of a windshield attachable to the mechanisms and of elements of a vehicle to which elements of the mechanisms are attachable to;

FIG. 16 is an enlarged, isometric view taken from a top, rear, left side of the mechanism, actuator and lock of FIG. 15.

DETAILED DESCRIPTION

Introduction

Figure 1:
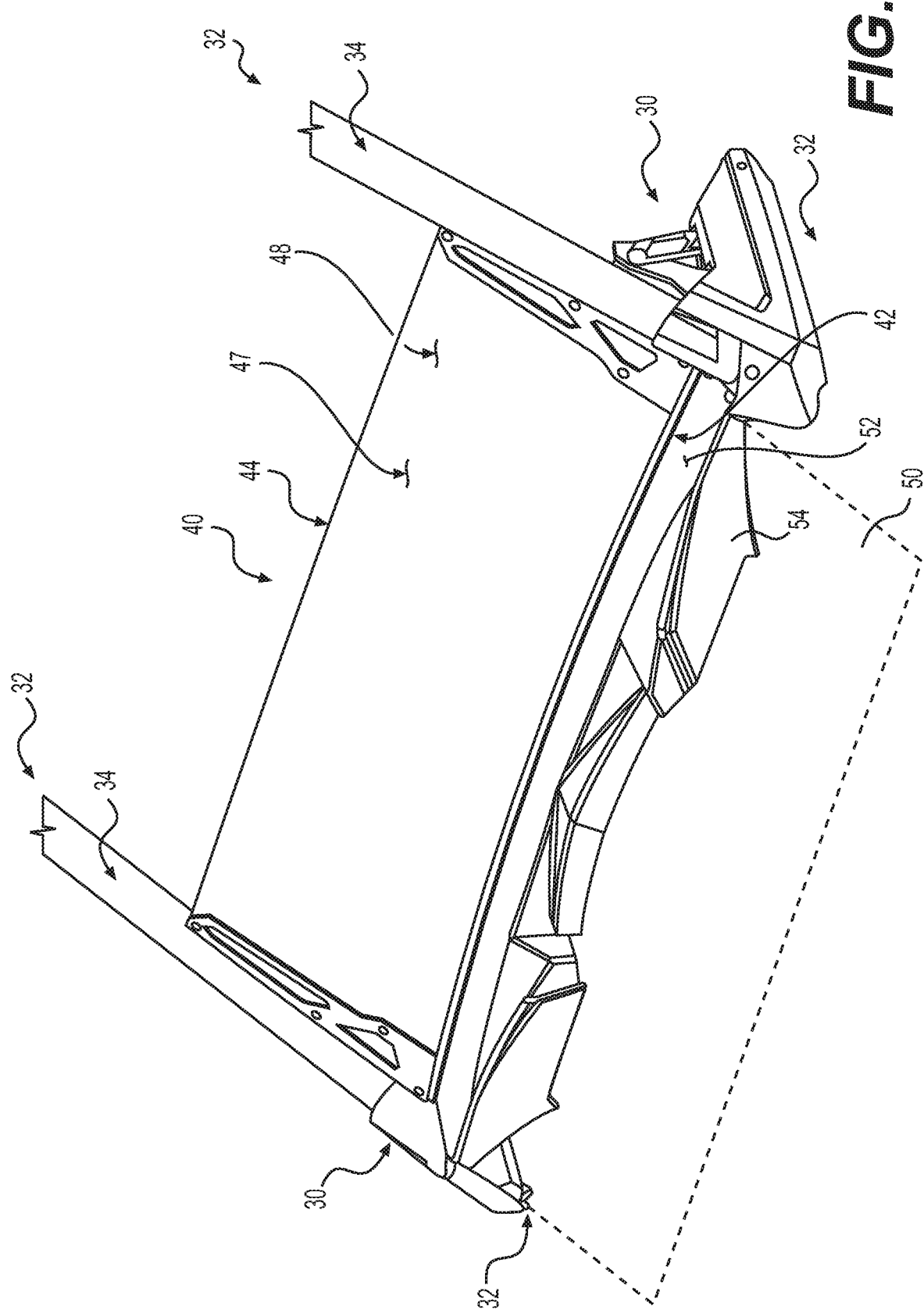
FIG. 1 is an isometric view taken from a top, front, left side of a left side windshield adjustment mechanism and a right side windshield adjustment mechanism being embodiments of the present technology, with a windshield attached to the mechanisms, the mechanisms attached to a vehicle and the mechanisms in an operative position.

With reference to FIGS. 1 to 16, a windshield adjustment mechanism 30 for a windshield 40 of a vehicle is shown.

It should be understood that the windshield adjustment mechanism 30 is merely an embodiment of the present technology. Thus, the description thereof that follows is intended to be only a description of illustrative examples of the present technology. This description is not intended to define the scope or set forth the bounds of the present technology.

Examples of modifications or alternatives to the windshield adjustment mechanism 30 are described below. This is done merely as an aid to understanding, and, again, not to define the scope or set forth the bounds of the present technology. These modifications are not an exhaustive list, and, as a person skilled in the art would understand, other modifications are likely possible.

Further, where this has not been done (i.e. where no examples of modifications have been set forth), it should not be interpreted that no modifications are possible and/or that what is described is the sole manner of implementing or embodying that element of the present technology.

In addition, it is to be understood that the windshield adjustment mechanism 30 may provide in certain aspects a simple embodiment of the present technology, and that where such is the case it has been presented in this manner as an aid to understanding. As persons skilled in the art would understand, various embodiments of the present technology may be of a greater complexity than what is described herein.

General Description—Vehicle

Referring to FIGS. 1 to 4, the present technology relates to a windshield adjustment mechanism 30 for a vehicle having a frame 32, a windshield 40, and a hood 50 (shown in dashed lines) connected to the frame 32 and extending on the front side of the vehicle.

The frame 32 forms a roll cage having front pillars 34 extending on a driver side and a passenger side of the vehicle.

The pillars 34 extend upward and rearward from the hood 50.

Figure 2:
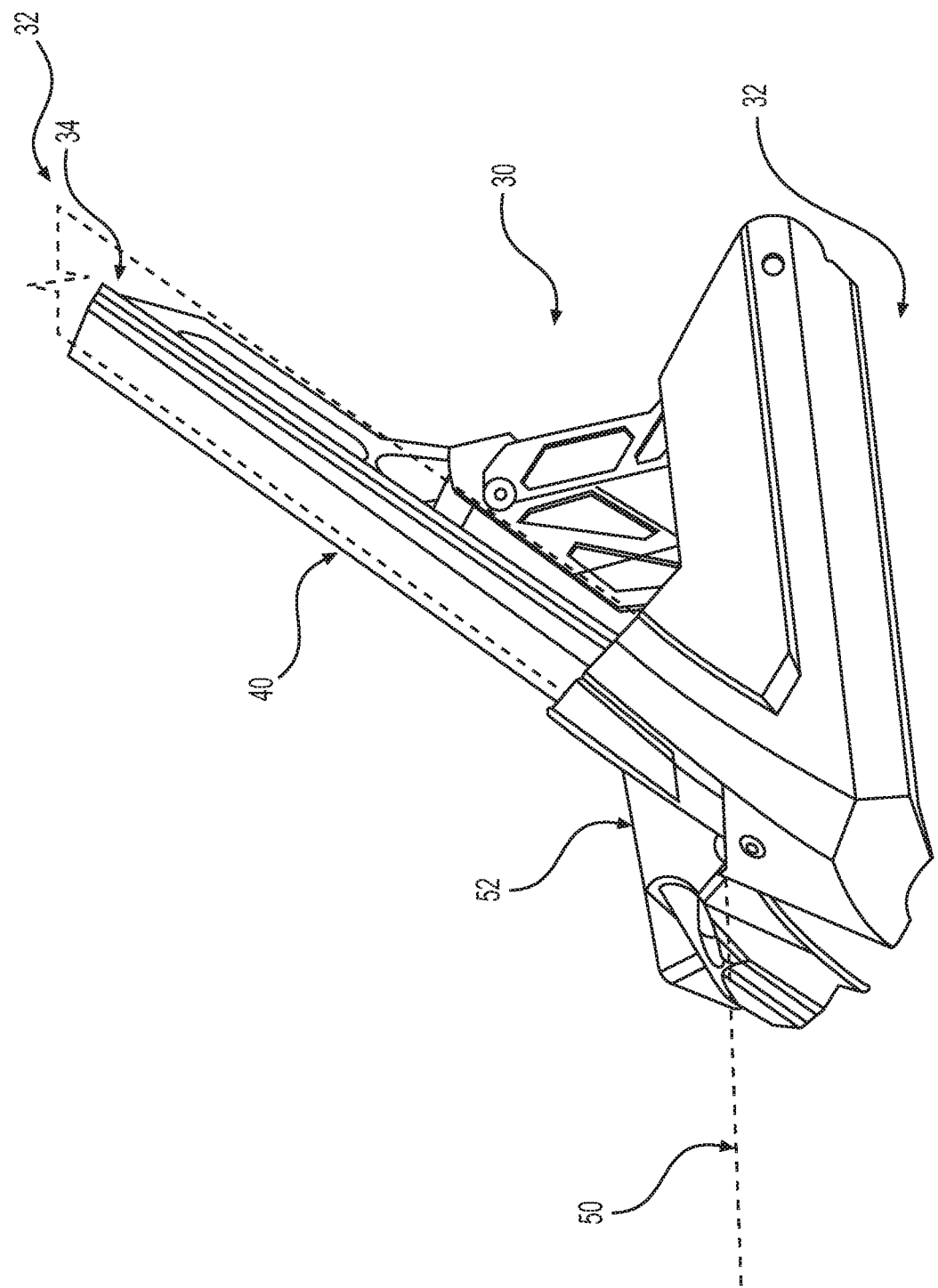
FIG. 2 is a lateral elevation view of the left side windshield adjustment mechanism of FIG. 1.

Referring to FIG. 2, the front driver side pillar 34 is shown in dashed lines.

Figure 3:
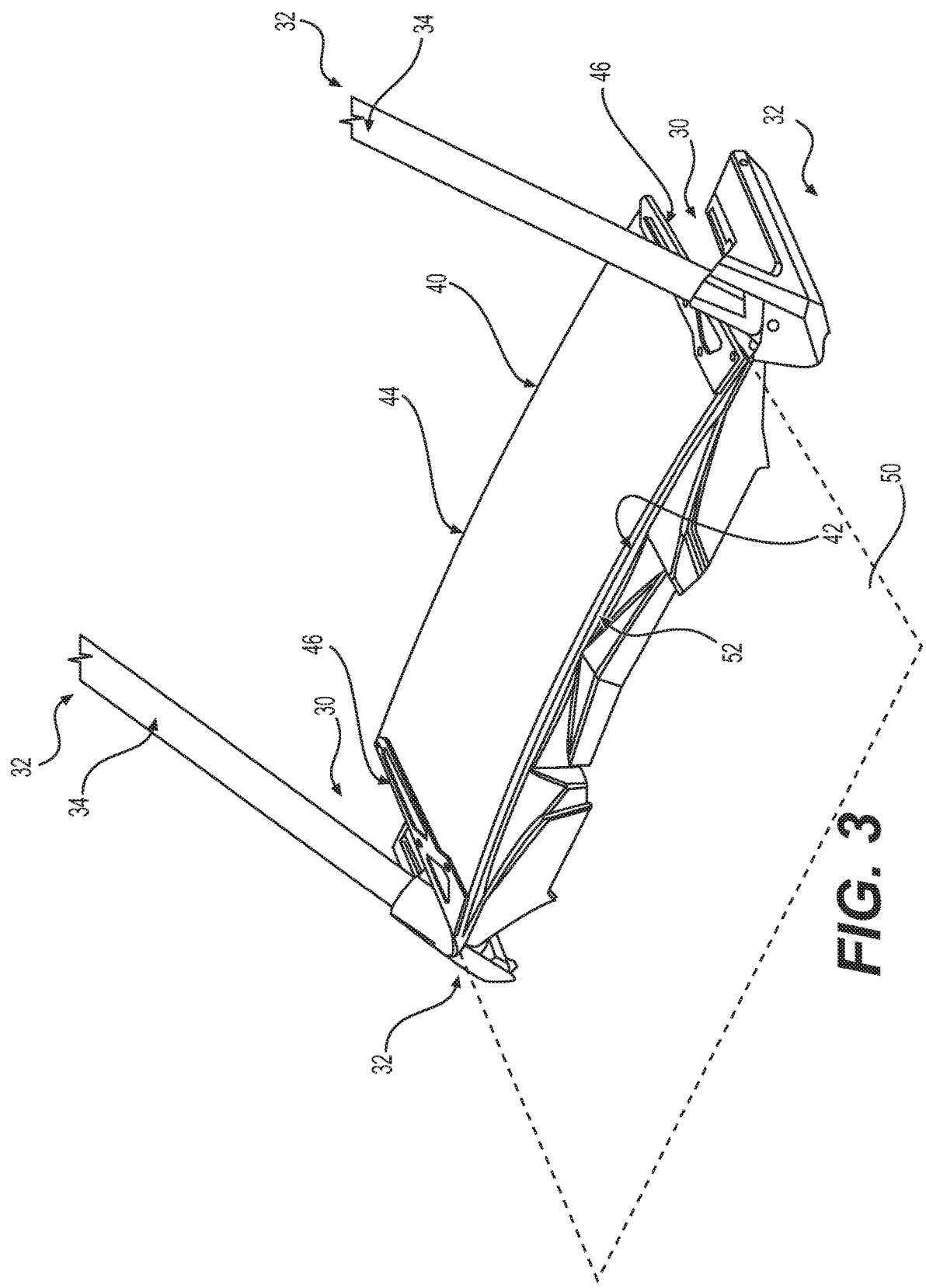
FIG. 3 is an isometric view taken from a top, front, left side of a left side windshield adjustment mechanism and a right side windshield adjustment mechanism of FIG. 1, with a windshield attached to the mechanisms, the mechanisms attached to a vehicle and the mechanisms in an inoperative position.

Referring to FIGS. 1 and 3, the windshield 40 has a bottom edge 42, a top edge 44, lateral edges 46, an external surface 47 and an internal surface 48 and extends between the front pillars 34.

The hood 50 has a top surface 52 that extends between the front pillars 34 and towards the front of the vehicle.

A cowling 54 is also provided on the hood 50.

General Description—Windshield Adjustment Mechanism

In FIGS. 1 and 3, two windshield adjustment mechanisms 30 are shown and are disposed on the driver's side and passenger's side of the vehicle, respectively. It is to be understood that the two windshield adjustment mechanisms 30 are a mirror image of each other, and only one of the windshield adjustment mechanisms will be described herein. (It is not necessary however that when multiple windshield adjustment mechanisms being embodiments of the present technology are used together that they be mirror images of one another. It is also not necessary that multiple or particular numbers of windshield adjustment mechanisms being embodiments of the present technology are used together.)

Figure 4:
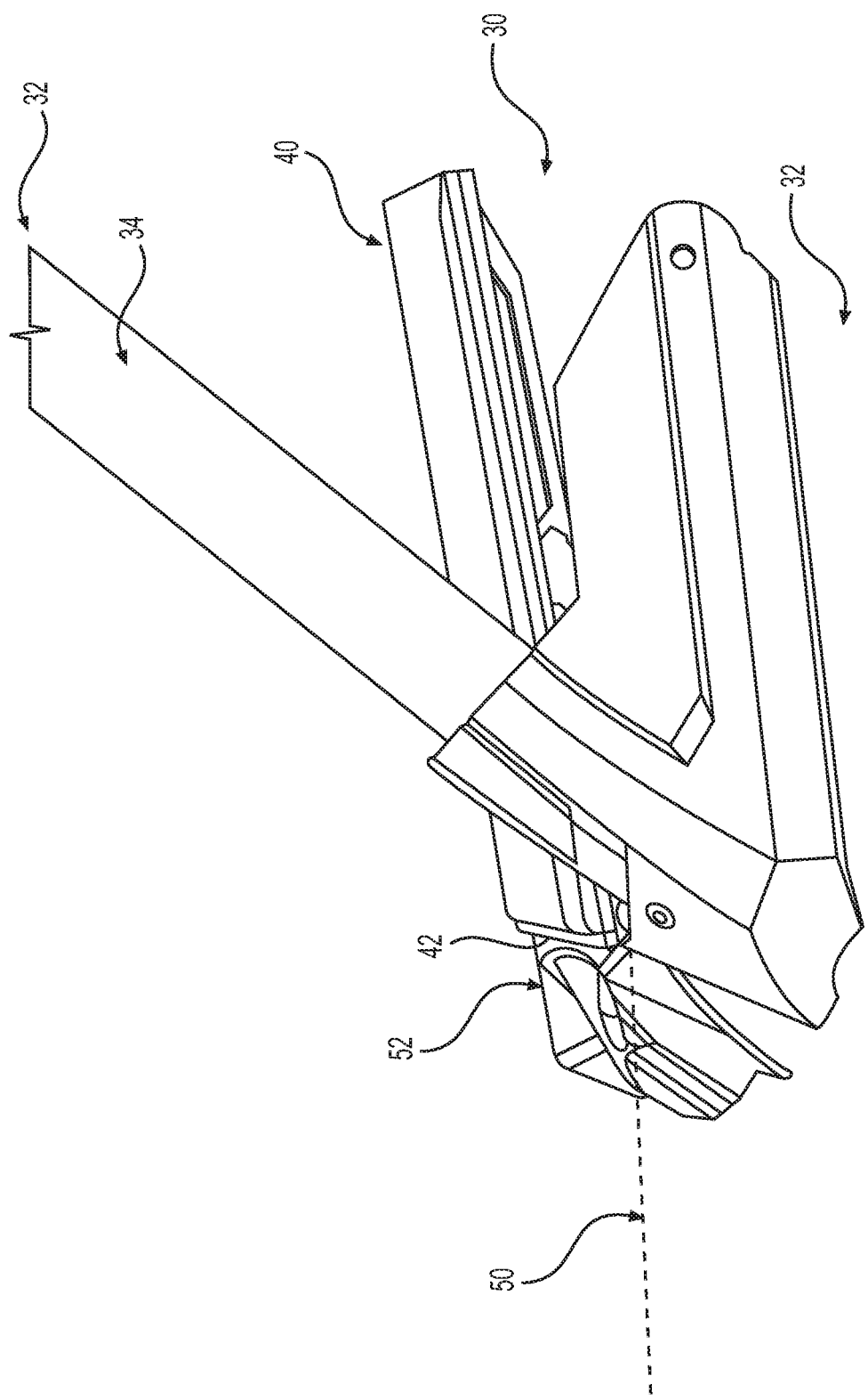
FIG. 4 is a lateral elevation view of the left side windshield adjustment mechanism of FIG. 3.

The windshield adjustment mechanism 30 is operable to simultaneously translate and pivot the windshield 40 with respect to the vehicle, between an operative position (shown in FIGS. 1 and 2) and an inoperative position (shown in FIGS. 3 and 4).

Figure 5:
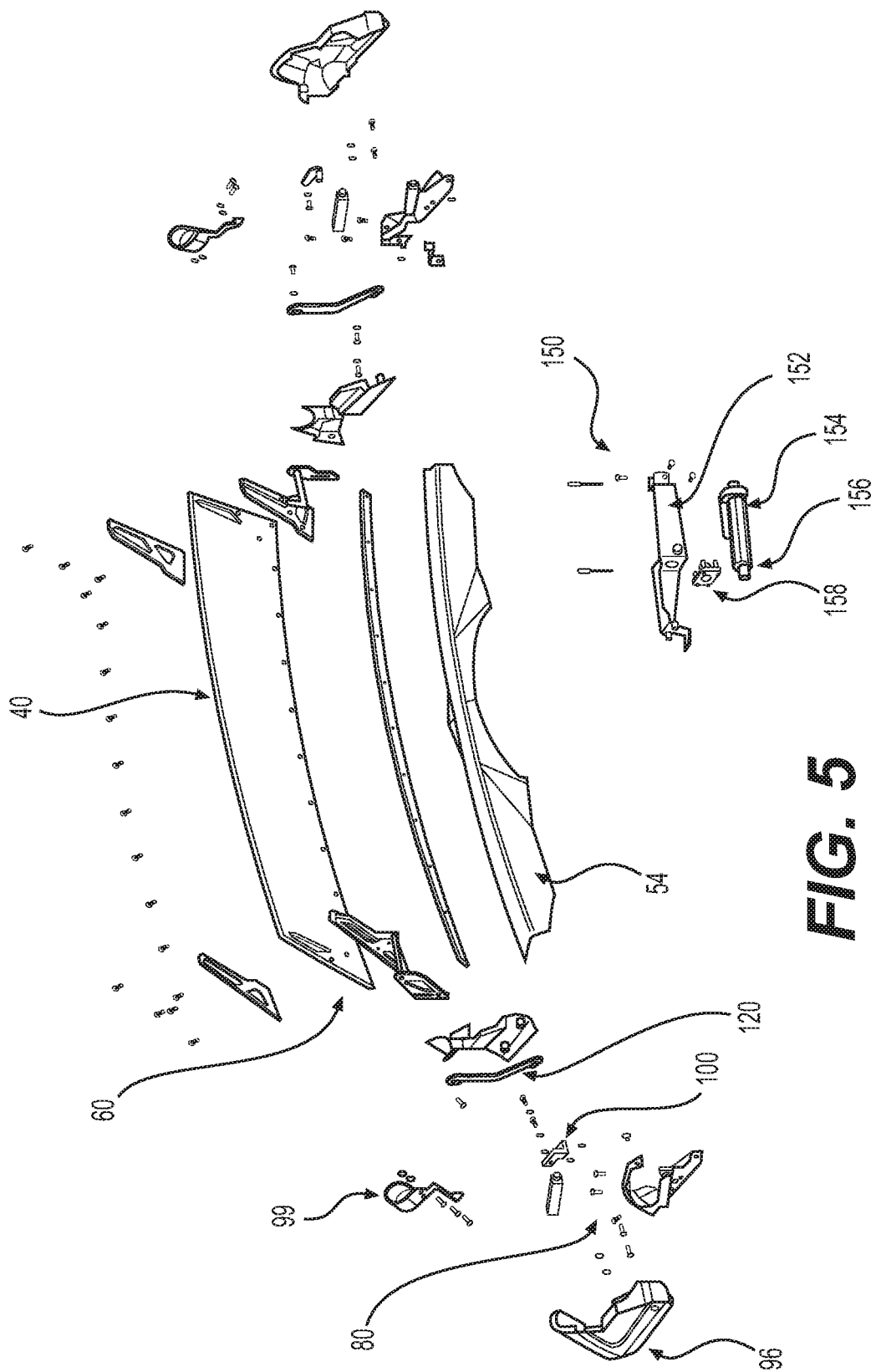

As shown in FIG. 5, the windshield adjustment mechanism 30 has a support 60 attachable to the windshield 40, a mount 80 attachable to the frame 32 of the vehicle, a carriage 100 movable with respect to the mount 80, and a link 120 operatively connecting the support 60 and the mount 80.

Support

Figure 6:
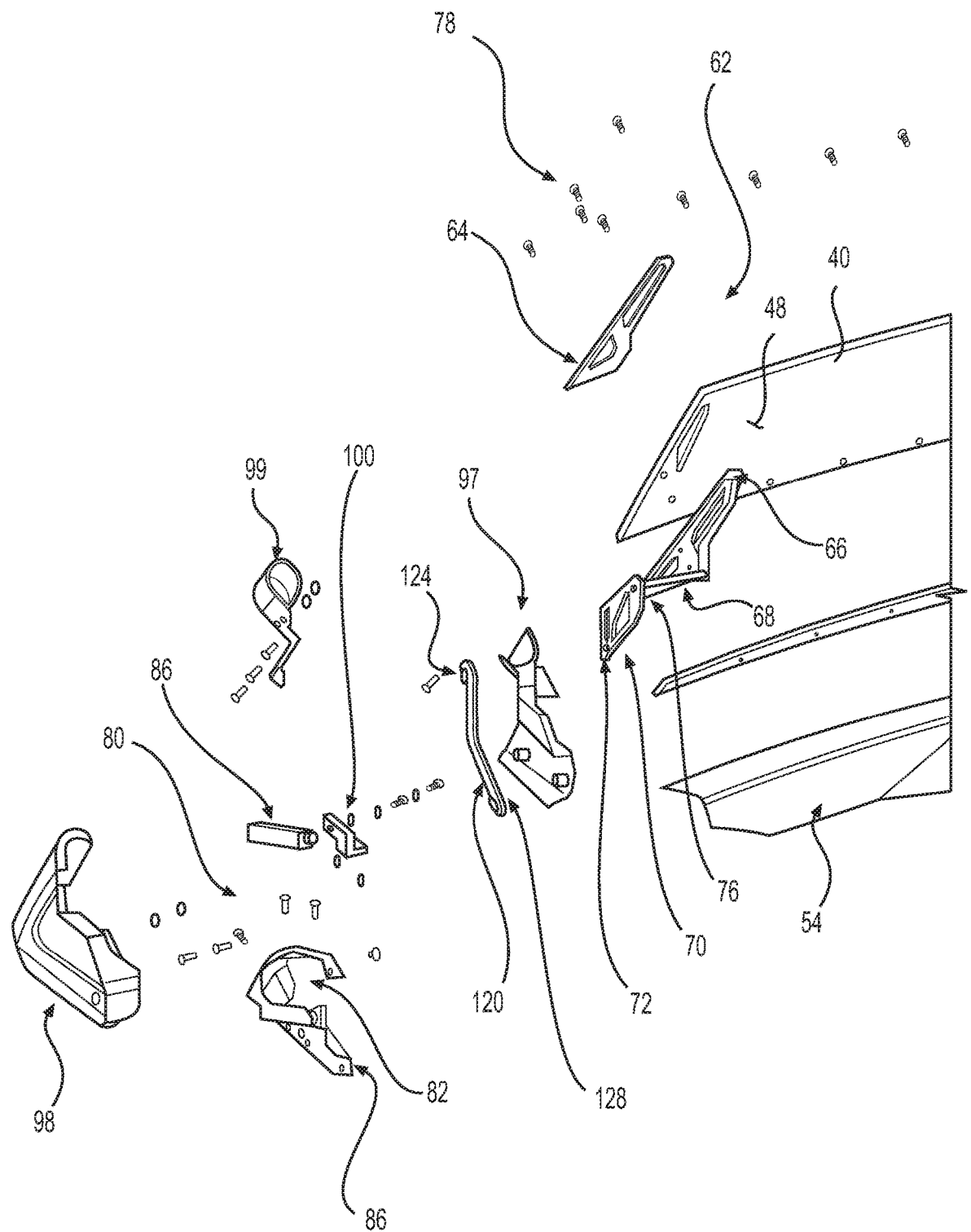
FIG. 6 is an enlarged view of the elements of the left side mechanism, of the windshield and of the elements of the vehicle of FIG. 5.

Referring to FIG. 6, the support 60 attachable to the windshield 40 has a tab 72 defining a part of a first pivotable connector 74 and has a tab 76 defining a part of a second pivotable connector 78, each being spaced apart from one another.

Figure 7:
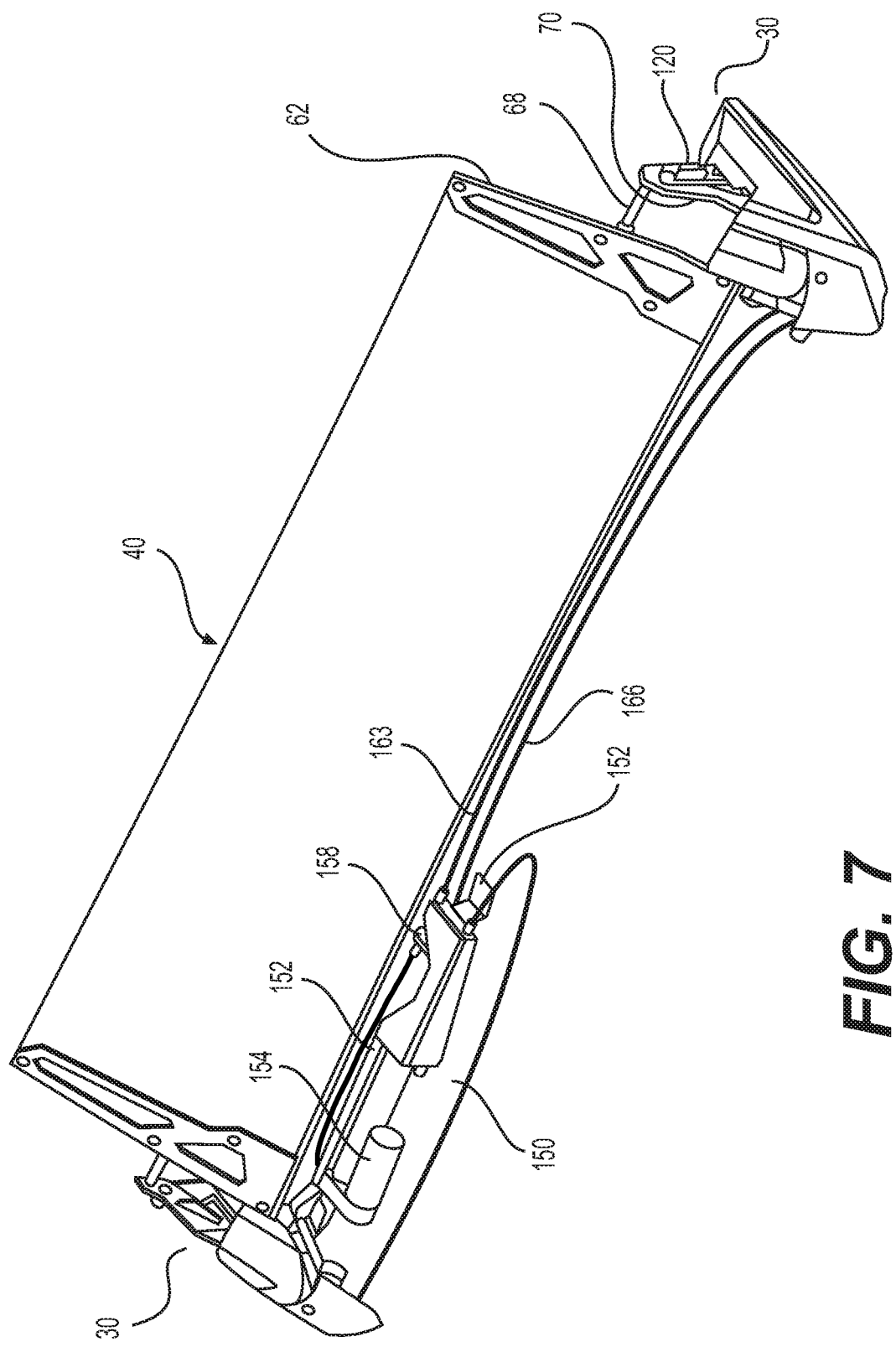
FIG. 7 is an isometric view taken from a top, front, left side of a left side windshield adjustment mechanism of FIG. 1 and a right side windshield adjustment mechanism of FIG. 1, showing a windshield and protectors attached to the mechanisms and showing a power-operated actuator and lock attached the vehicle and operatively connected to the mechanisms.

In the present embodiment, as shown in FIGS. 6 and 7, the support 60 has a bracket 62, itself having an external part 63 connected to the external surface 47 of the windshield 40 and an internal part 65 connected to the internal surface 48 of the windshield 40. The support 60 also has a second link 68 projecting outwardly from the bracket 62 and a third link 70 attached to the second link 68. The third link 70 has the tab 72 defining the part of the first pivotable connector 74 and the tab 76 defining the part of the second pivotable connector 78.

In the present embodiment, the support 60 is shown to be attachable to the windshield 40 by (i) the bracket 62 and a plurality of fasteners 67. The external part 63 of the bracket 62 makes contact with an area of the external surface 47 of the windshield 40. The internal part 65 of the bracket 62 makes contact with an area of the inner surface 48 of the windshield 40. A number of fasteners 67 fixedly connect the bracket 62 to the windshield 40.

Referring to FIGS. 1 and 7, the bracket 62, the second link 68 and the third link 70 of the support 60 are sized and positioned one with respect to the other to have the bracket 62 positioned interior to the pillar 34 and to have a part of the first pivotable connector 74 and the part of the second pivotable connector 78 positioned exterior of the pillar 34.

It is contemplated that, in other embodiments, the bracket 62, the second link 68 and the third link 70 of the support 60 could be sized and positioned differently one with respect to the other and/or with respect to an element of the vehicle.

Figure 15:
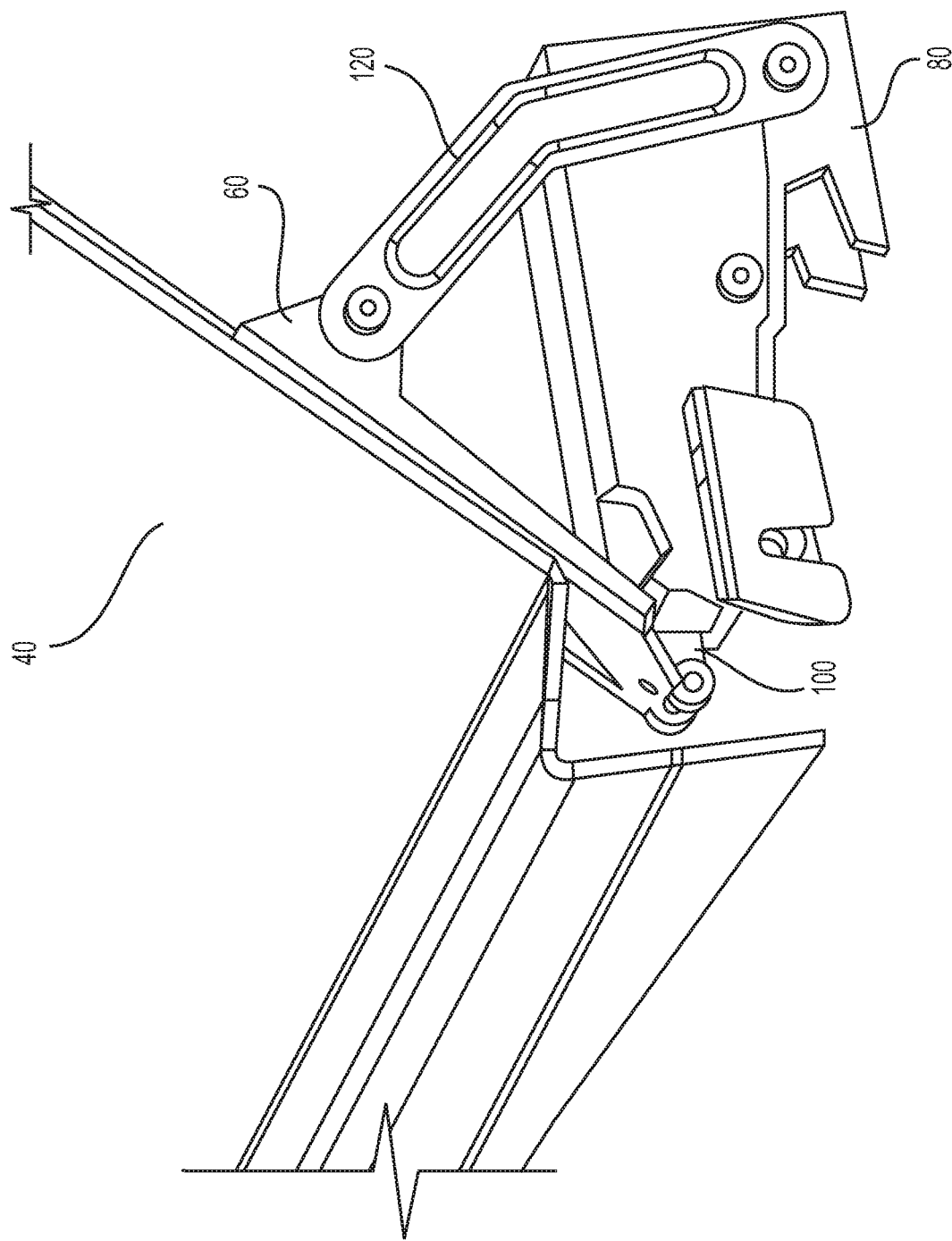
FIG. 15 is an enlarged, isometric view taken from a top, front, left side of the of a windshield adjustment mechanism in accordance with the present technology, showing a windshield attached to the mechanism and showing a manually-operated actuator and lock attached the vehicle and operatively connected to the mechanism.

It is further contemplated that, in other embodiments, the bracket 62 of the support 60 could be a single part, connected either to the external surface 47 or the internal surface 48 of the windshield 40 (as shown in FIGS. 15 and 16).

Furthermore, it is contemplated that, in other embodiments, the windshield 40 and the support 60 could be attached otherwise.

Mount

Figure 8:
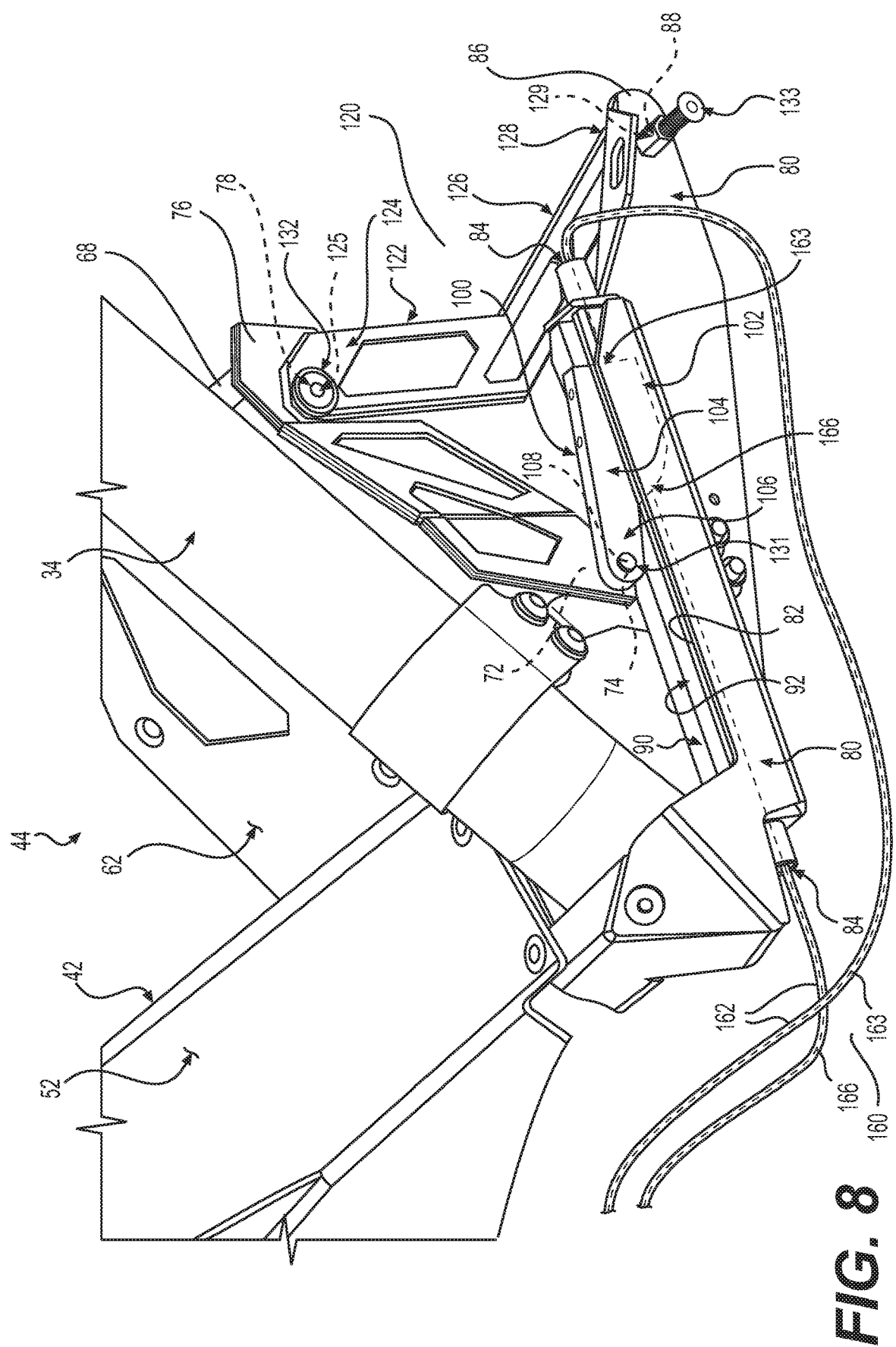
FIG. 8 is an enlarged, isometric view taken from a top, front, left side of the left side mechanism of FIG. 2, with the mechanism not covered by a protector, operatively attached to the actuator and lock of FIG. 7 and with the carriage in a rear most position with respect to the guideway.

Referring to FIGS. 6 and 8, the mount 80 is attachable to the frame 32 of the vehicle. The mount 80 defines a housing 82 for receiving a guideway 90 therein. The housing 82 has ports 84 positioned at each end of the housing 82 for receiving jackets 162 of cables 163 and 166 that will be described further below. The guideway 90 has a through channel 92 oriented upwardly. (It is contemplated that, in other embodiments, the mount 80 and the guideway 90 could be integral. In further embodiments, it is contemplated that the channel 92 could be oriented otherwise, and/or could be blind at one or both ends, or could be absent from the guideway 90.)

The mount 80 also has a tab 86 defining a part of a third pivotable connector 88.

Referring to FIGS. 5, 6 and 7, the mount 80 is covered by a protector 96, having an internal part 97, and an external part 98. The mount 80 is further attachable to the pillar 34 by a pillar bracket 99.

Carriage

Figure 9:
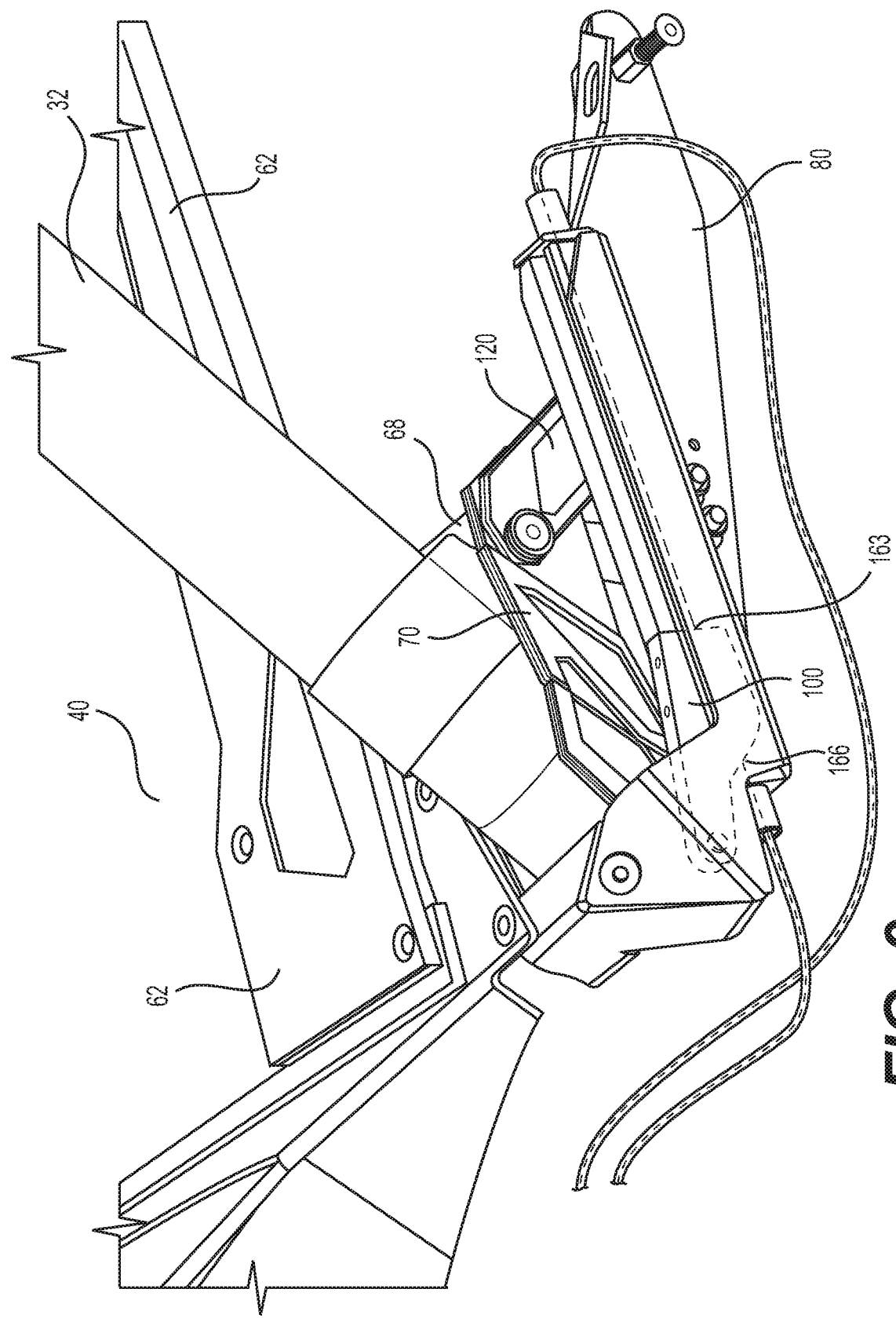
FIG. 9 is an enlarged, isometric view taken from a top, front, left side of the left side mechanism of FIG. 4, with the mechanism not covered by a protector, operatively attached to the actuator and lock of FIG. 7 and with the carriage in a forward most position with respect to the guideway.

Referring to FIGS. 8 and 9, the carriage 100 has a portion 102 that is slidingly mounted with respect to the guideway 90. The portion 102 is connected to cables 163 and 166 so as to be slid within the channel 92 toward a rearwardmost position (shown in FIG. 8) or a forwardmost position (shown in FIG. 9) of the guideway 90 when a force is applied to the carriage 100 via tension of the raising cable 163 or the lowering cable 166, respectively.

The carriage 100 further has a portion 104 extending upwardly and forwardly from the portion 102 and outwardly from the guideway 90. The portion 104 has a tab 106 defining a complementary part of the first pivotable connector 108, thereby pivotably attached to the support 60 via a fastener 131.

It is contemplated that, in other embodiments, the carriage 100 and the guideway 90 could be arranged otherwise. For example, in embodiments having the channel 92 oriented laterally, the portion 104 could extend laterally from portion 102 and from the guideway 90. In a further example, the carriage 100 could be slidingly mounted with respect to the guideway 90 having a plurality of channels or none.

Link

Referring to FIGS. 6, 8 and 9, the link 120 has a portion 122 having a tab 124 defining a complementary part of the second pivotable connector 125, thereby pivotably attaching the link 120 to the support 60 via a fastener 132. The link 120 further has a portion 126 having a tab 128 defining a complementary part of the third pivotable connector 129, thereby pivotably attaching the link 120 to the mount 80 via a fastener 133.

Kinematics

As described above, the windshield adjustment mechanism 30 is operable to simultaneously translate and pivot the windshield 40 with respect to the frame 32 of the vehicle, between an operative position (shown in FIGS. 1 and 2) and an inoperative position (shown in FIGS. 3 and 4).

Moreover, the windshield adjustment mechanism 30 is operable to produce desired kinematics by having the elements appropriately sized and arranged one with respect to the other, and by constraining the degrees of freedom of their movement as the windshield adjustment mechanism 30 is actuated, as described in further detail below.

The portion 102 of the carriage 100 slidingly mounted with respect to the guideway 90 corresponds to a prismatic joint, whose single degree of freedom allows the translation of the carriage 100 along the channel 92 of the guideway 90.

The complementary part of the first pivotable connector 108 of the carriage 100, pivotably connected to the part of the first pivotable connector 74 of the support 60 via the fastener 131, corresponds to a revolute joint, whose single degree of freedom allows the rotation of the support 60 with respect to the carriage 100 around a first pivotable connector axis 141.

The part of the second pivotable connector 78 of the support 60, pivotably connected to the complementary part of the second pivotable connector 125 of the link 120 via the fastener 132, corresponds to a revolute joint, whose single degree of freedom allows the rotation of the support 60 and of the link 120 with respect to one another around a second pivotable connector axis 142.

The part of a third pivotable connector 88 of the mount 80, pivotably connected to the complementary part of the third pivotable connector 129 of the link 120 via the fastener 133, corresponds to a revolute joint, whose single degree of freedom allows the rotation of the link 120 with respect to the mount 80 around a third pivotable connector axis 143.

Figure 10:
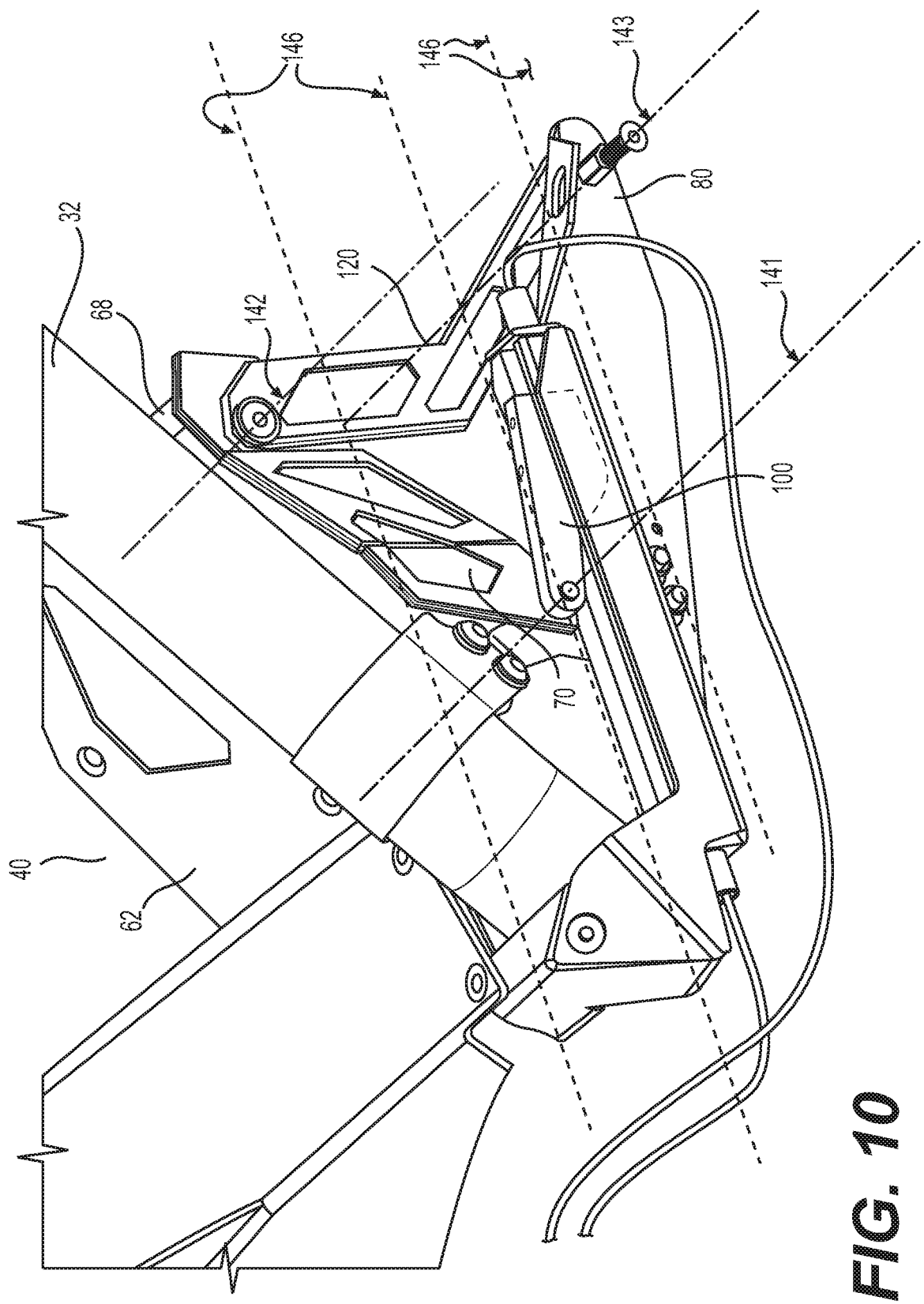
FIG. 10 is an enlarged, isometric view taken from a top, front, left side of the left side mechanism of FIG. 8, showing the axis of the lower, upper and third pivotable connectors in dotted lines, and showing the plane, also in dotted lines, defined by 2 lines collinear with the axis of the first pivotable connector when the carriage is in the position shown in FIG. 8 and when the carriage is in the position shown in FIG. 9, respectively.
Figure 11:
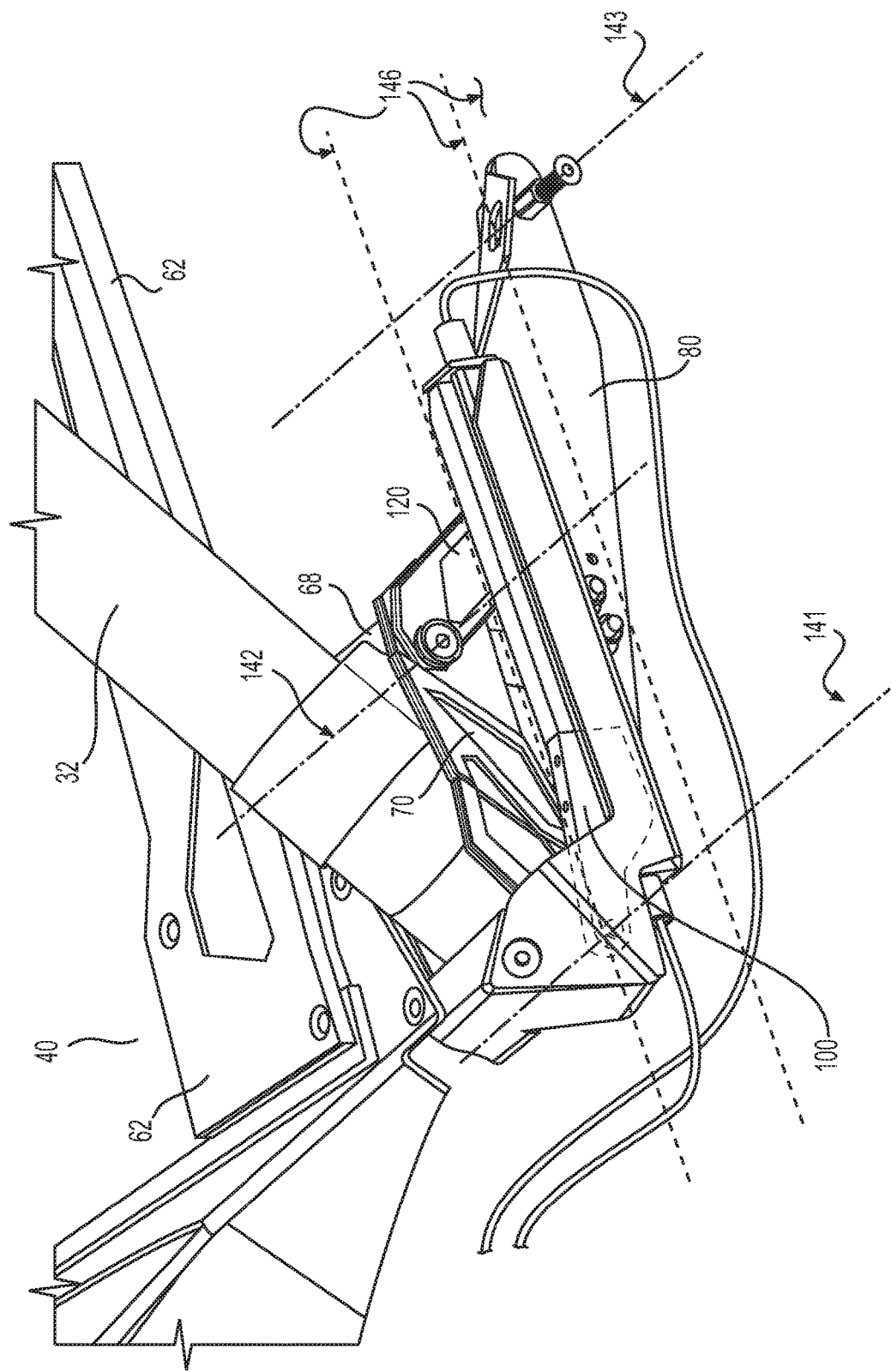
FIG. 11 is an enlarged, isometric view taken from a top, front, left side of the left side mechanism of FIG. 9, showing the axis of the lower, upper and third pivotable connectors in dotted lines, and showing the plane, also in dotted lines, defined by 2 lines collinear with the axis of the first pivotable connector when the carriage is in the position shown in FIG. 8 and when the carriage is in the position shown in FIG. 9, respectively.
Figure 12:
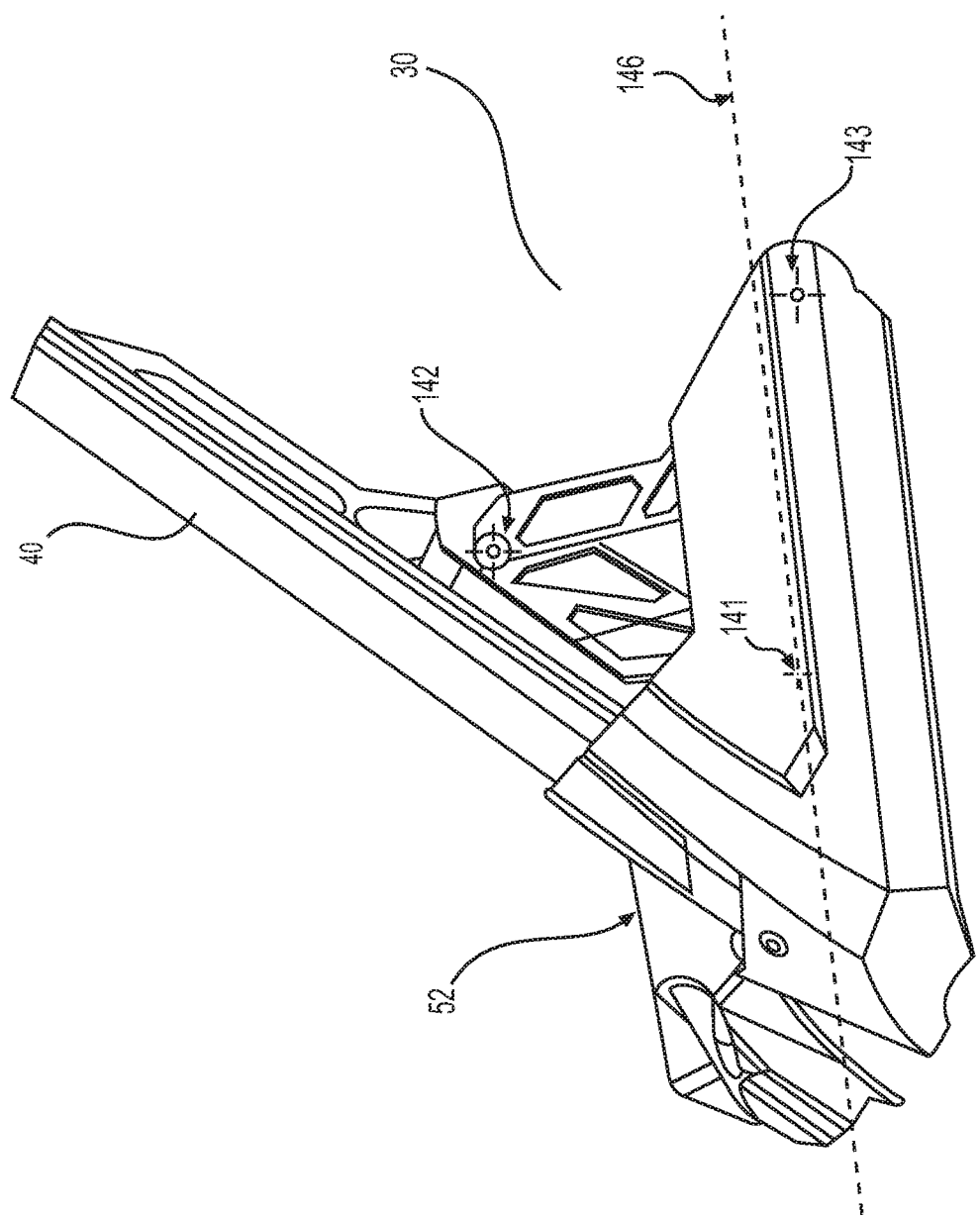
FIG. 12 is a lateral elevation view of the mechanism of FIG. 2, showing the axis and the plane of FIGS. 10 and 11.

Therefore, referring to FIGS. 10, 11 and 12 and in view of the mount 80 being rigidly attached to the frame 32 of the vehicle, the windshield adjustment mechanism 30 simultaneously translates and pivots the windshield 40 attached to the support 60 with respect to the frame 32 as (I) the actuation of the carriage 100 translates the carriage 100 with respect to the mount 80, (II) simultaneously translates the support 60 with respect to the mount 80, (III) simultaneously pivots the support 60 with respect to the carriage 100 around the first pivotable connector axis 141, (IV) simultaneously pivots the support 60 and the link 120 with respect to one another around the second pivotable connector axis 142 and (V) simultaneously pivots the link 120 with respect to the mount 80 around the third pivotable connector axis 143.

The desired kinematics of the windshield adjustment mechanism 30 is further achieved by having the elements appropriately sized and arranged one with respect to the other such that the third pivotable connector axis 143 is at a position not above a plane 146 defined by the first pivotable connector axis 141 when the carriage 100 is in the forwardmost position and the first pivotable connector axis 141 when the carriage 100 is in the rearwardmost position.

Furthermore, the desired kinematics of the windshield adjustment mechanism 30 maintains the bottom edge 42 at a constant distance from the top surface 52 of the hood 50.

In another embodiment, the distance between the bottom edge 42 and the top surface 52 can vary by no more than 10 mm.

In yet another embodiment, the distance between the bottom edge 42 and the top surface 52 can vary by no more than 5% of the distance between the position of the first pivotable connector axis 141 when the carriage 100 is in the forward most position, and the position of the first pivotable connector axis 141 when the carriage 100 is in the rearward most position.

Actuation and Locking

Figure 13:
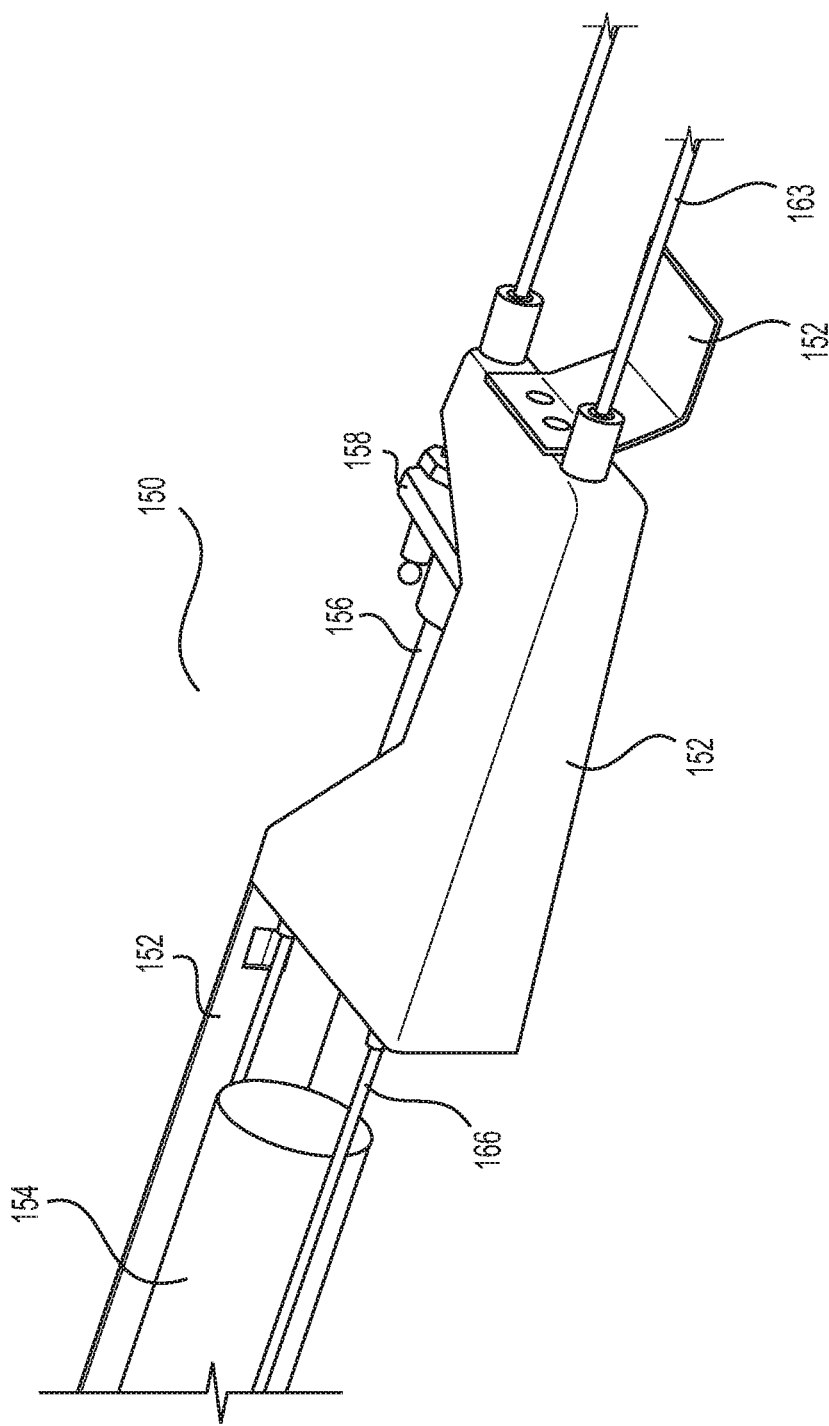
FIG. 13 is an enlarged, isometric view taken from a top, front, left side of the actuator of FIG. 7.
Figure 14:
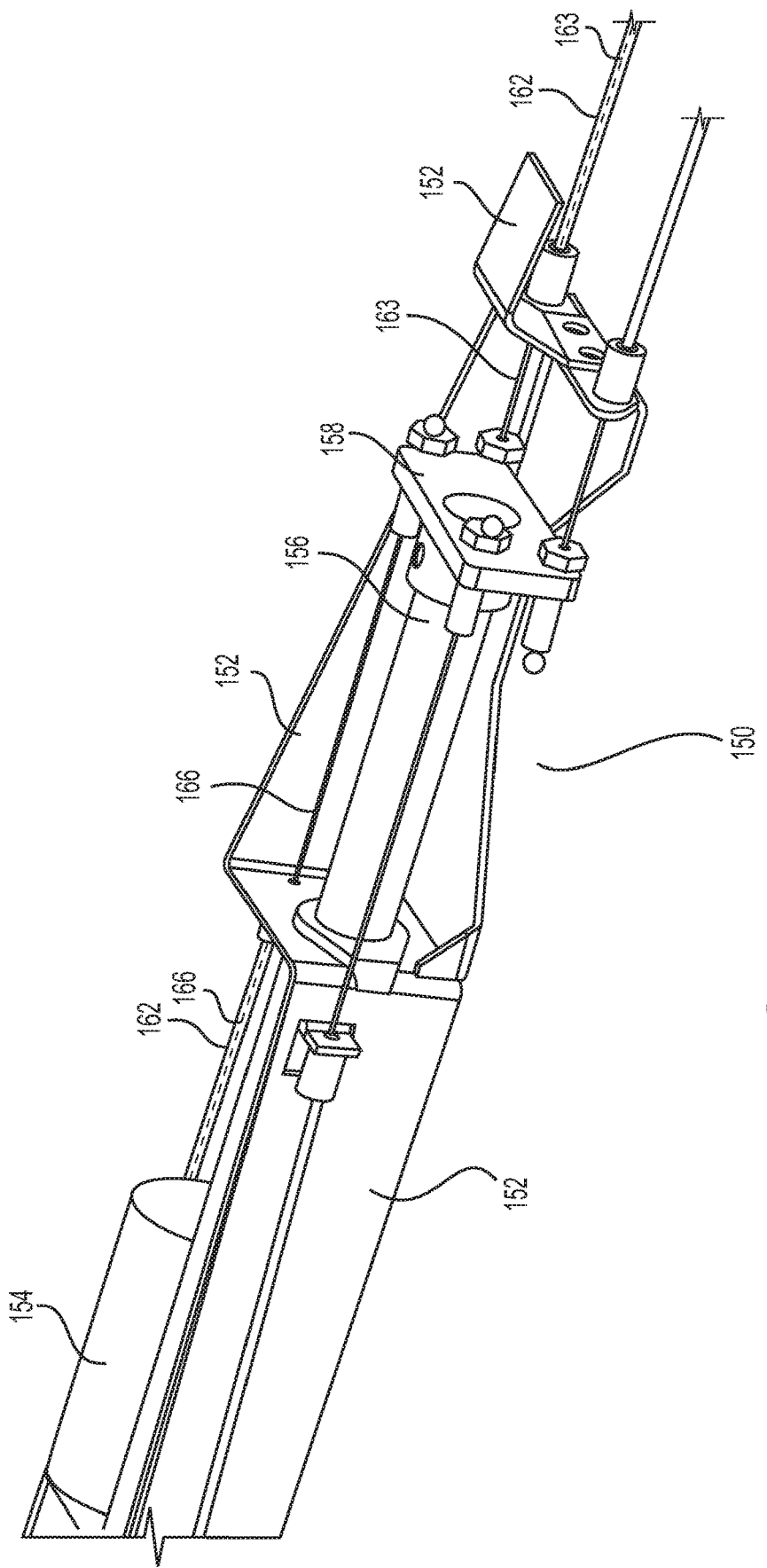
FIG. 14 is an enlarged, isometric view taken from a bottom, rear, right side of the actuator of FIG. 13.

Referring to FIGS. 7, 13 and 14, the windshield adjustment mechanism 30 is actuable by a linear actuator 150, having a bracket 152, an electric motor 154, a screw assembly 156, a tab 158 and cables 160 each protected in a jacket 162.

Furthermore, the windshield adjustment mechanism 30 is lockable by the static loading capacity of the actuator 150, acting as a lock when the motor 154 is not powered.

As such, a pushing or pulling load imparted to the tab 158 against the screw assembly 156 by either the raising cable 163 or the lowering cable 166 respectively is supported by the actuator 150, thereby maintaining the windshield 40 in a desired position adjustment.

Referring to FIG. 15, in another embodiment, manual actuation can be performed by the driver or a passenger, such that the application of a force to the windshield 40 or an element of the windshield adjustment mechanism 30 causes the carriage 100 to slide with respect to the guideway 90 until a position is selected and maintained by use of a lock. In this embodiment, the portion 104 of the carriage 100 is equipped with teeth 172 projecting downwardly and the mount 80 is equipped with a lock 170 that can be selectably positioned with respect to the carriage 100 so that it either engages with the teeth 172 to maintain a desired position adjustment of the windshield 40 or stays clear of the teeth 172 to allow the actuation of the windshield adjustment mechanism 30.

It is contemplated that the windshield adjustment mechanism could be actuated and locked otherwise.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A windshield adjustment mechanism for a windshield of a vehicle, the mechanism comprising:
   a support attachable to the windshield, the support having a first part of a first pivotable connector and a first part of a second pivotable connector, the first part of the first pivotable connector and the first part of the second pivotable connector being spaced apart from one another;
   a mount attachable to the vehicle, the mount having a guideway and a first part of a third pivotable connector;
   a carriage having a second part of the first pivotable connector and having a portion slidingly mounted with respect to the guideway and being slidable between a forwardmost position and a rearward most position with respect to the guideway;
   a link having a second part of the second pivotable connector and a second part of the third pivotable connector, the second part of the second pivotable connector and the second part of the third pivotable connector being spaced apart from one another;
   the first pivotable connector, the second pivotable connector and the third pivotable connector being positioned each with respect to the others, and the support, the guideway, the carriage and the link being positioned, oriented and dimensioned, such that sliding of the carriage causes simultaneous (i) translating of the support and of the carriage with respect to the mount via translation of the first pivotable connector, (ii) pivoting of the support with respect to the carriage about a first pivotable connector axis, whereby a position of the windshield attached to the support is adjusted.

2. The mechanism of claim 1, wherein the carriage is operatively connectable to an actuator to cause the carriage to slide with respect to the guideway.

3. The mechanism of claim 1, wherein the mechanism is structured and arranged such that, when the mechanism is mounted to the vehicle and the windshield is attached to the support, manual repositioning of the windshield causes the carriage to slide with respect to the guideway.

4. The mechanism of claim 1, further comprising a lock structured and positioned to selectively maintain the carriage in at least one position with respect to the guideway intermediate the forwardmost position and the rearwardmost position.

5. The mechanism of claim 1, wherein the first pivotable connector, the second pivotable connector and the third pivotable connector are positioned each with respect to the others, and the support, the guideway, the carriage and the link are positioned, oriented and dimensioned, such that sliding of the carriage is actuable with a constant force to and from any position between the forwardmost position and the rearwardmost position.

6. The mechanism of claim 1, wherein the first pivotable connector, the second pivotable connector and the third pivotable connector are positioned each with respect to the others, and the support, the guideway, the carriage and the link are positioned, oriented and dimensioned, such that when the carriage is slid with respect to the guideway, the windshield adjustment mechanism further causes a simultaneous (iii) pivoting of the support with respect to the link about a second pivotable connector axis, (iv) pivoting of the link with respect to the mount about a third pivotable connector axis.

7. The mechanism of claim 1, wherein the third pivotable connector is positioned not above a plane defined by a first line collinear with the first connector pivot axis when the carriage is in the forwardmost position and a second line collinear with the first connector pivot axis when the carriage is in the rearwardmost position.

8. The mechanism of claim 1, wherein, when the mechanism is mounted to the vehicle, a bottom edge of an attached windshield is at a constant distance from a plane defined by a first line collinear with the first pivotable connector axis when the carriage is in the forwardmost position and a second line collinear with the first pivotable connector axis when the carriage is in the rearwardmost position, when the carriage is at any position between the forwardmost position and the rearwardmost position.

9. The mechanism of claim 1, wherein, when the mechanism is mounted to the vehicle, when the carriage is at any position between the forwardmost position and the rearwardmost position, a bottom edge of an attached windshield is at a distance from a top surface of a hood attached to the vehicle no greater than 5% of a distance between the first pivotable connector axis when the carriage is in the forwardmost position and the first pivotable connector axis when the carriage is in the rearwardmost position.

10. The mechanism of claim 1, wherein, when the mechanism is mounted to the vehicle, a bottom edge of an attached windshield is at a distance from a top surface of a hood attached to the vehicle no greater than 10 mm, when the carriage is at any position between the forwardmost position and the rearwardmost position.

11. The mechanism of claim 1, wherein, when the mechanism is mounted to the vehicle, when the carriage is at the forwardmost position an attached windshield is in an inoperative position and when the carriage is the rearwardmost position an attached windshield is an operative position.

12. The mechanism of claim 1, wherein, when the mechanism is mounted to the vehicle, when the carriage is at the forwardmost position an attached windshield is in an inoperative position and when the carriage is the rearwardmost position an attached windshield is a fully operative position.

13. The mechanism of claim 1, wherein, when the mechanism is mounted to the vehicle, when the carriage is at one of a plurality of positions between the forwardmost position and the rearwardmost position an attached windshield is at one of a plurality of partially-operative positions.

14. The mechanism of claim 1, wherein the carriage has a front portion having the second part of the first pivotable connector, and the portion slidingly mounted with respect to the guideway is a rear portion of the carriage.

15. The mechanism of claim 1, wherein the support includes a bracket attachable to the windshield, a second link attached to the bracket, and a third link attached to the second link, the third link having the first part of the first pivotable connector and the first part of the second pivotable connector.

16. The mechanism of claim 15, wherein, when the mechanism is mounted to the vehicle, a lateral edge of an attached windshield and the bracket are interior to a pillar of the vehicle and the first link, the third link, the carriage and the mount are exterior of the pillar of the vehicle.

17. The mechanism of claim 1, wherein, when the mechanism is viewed from a side and the carriage is in the rearwardmost position, the first pivotable connector, the second pivotable connector and the third pivotable connector are positioned in a triangular relationship.

18. The mechanism according to claim 1, wherein the carriage further has downwardly projecting teeth, and the teeth are engageable with the mount to selectively maintain the position of the carriage with respect to the mount.

19. The mechanism according to claim 2, wherein the actuator is electrically-operated.

* * * * *